May 31, 1927.  1,630,262
F. FRASER
PROCESS OF MAKING OPHTHALMIC BLANKS
Filed July 16, 1924  4 Sheets-Sheet 2

INVENTOR
Frank Fraser.
BY
Harry H. Styll
ATTORNEY

May 31, 1927. 1,630,262
F. FRASER
PROCESS OF MAKING OPHTHALMIC BLANKS
Filed July 16, 1924    4 Sheets-Sheet 3

INVENTOR
Frank Fraser.
BY
Harry H. Styll
ATTORNEY

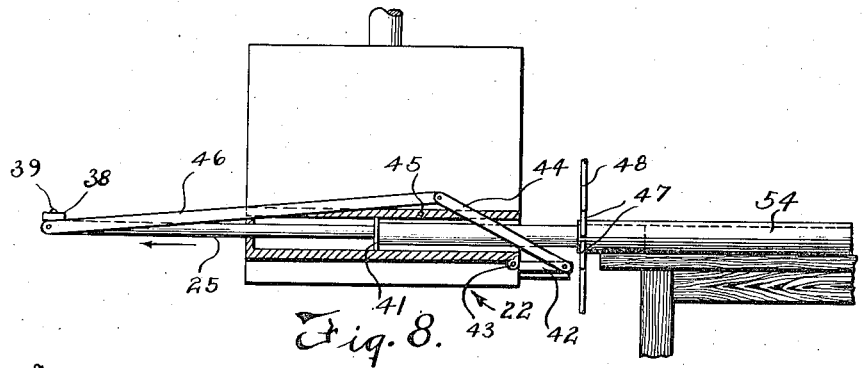
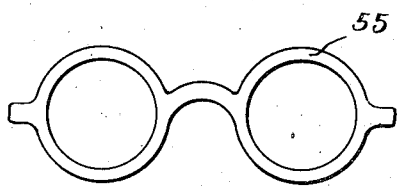
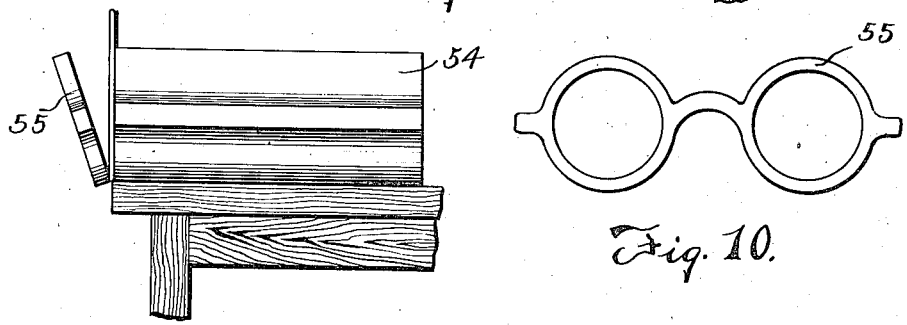
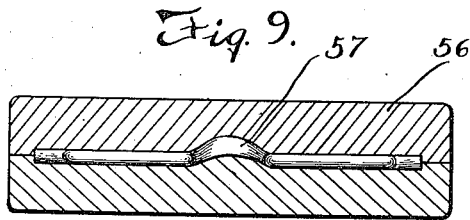
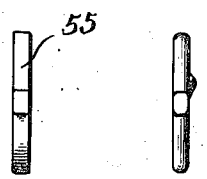
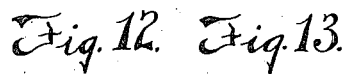
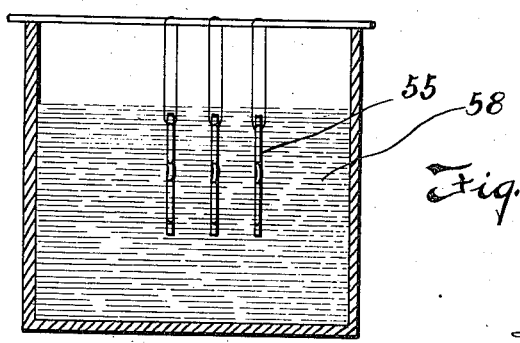

Patented May 31, 1927.

1,630,262

UNITED STATES PATENT OFFICE.

FRANK FRASER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

PROCESS OF MAKING OPHTHALMIC BLANKS.

Application filed July 16, 1924. Serial No. 726,324.

The present invention relates to improved apparatus and process for manufacturing cellulose composition material ophthalmic spectacle and eyeglass mountings.

A very important object of this invention is to provide apparatus and process for manufacturing opthalmic spectacle and eyeglass mountings in such a way that there will be practically no waste of the cellulose composition material employed in the type of mountings made from such material.

Another important object of the invention is to provide apparatus for forming a master blank from cellulose composition material from the green stock, after which the master blank may be either before or after seasoning, cut up into individual opthalmic blanks from which the finished frames are made.

Another important object of the invention is to provide apparatus for forming a master blank for use in connection with the manufacture of opthalmic spectacle and eyeglass mountings, which master blank may be suitably cut up into lengths to adapt the individual lengths to be used for forming a finished opthalmic mounting without the usual waste of material heretofore experienced.

Another important object of the invention is to provide apparatus and process for forcing cellulose composition material into a mold, applying pressure to the material within the mold to give the composition the required consistency, and then allowing the material so molded to set up, thus forming a master blank from which a plurality of individual opthalmic blanks may be formed.

Another important object of the invention is to provide means whereby cellulose composition material can be forced into a mold to form a master blank, after which the master blank can be cut up into individual blanks for opthalmic mountings, placing the individual blank into a mold to shape the blank to the desired curvatures, and then dipping the shaped blank in a suitable substance to give polish and luster to the molded blank.

Other objects and advantages of the invention will become apparent during the course of the following description.

In the drawings, wherein like numerals are employed to designate like parts throughout the same:

Figure 8 is a fragmentary sectional view illustrating one method of removing the cellulose composition material after molding;

Figure 9 shows the master blank being separated into individual blanks;

Figure 10 is a front elevation of the individual blank;

Figure 11 shows the individual blank in the shaping mold;

Figure 12 shows the blank before shaping;

Figure 13 shows the blank after shaping;

Figure 14 shows the dipping operation.

Figure 1:
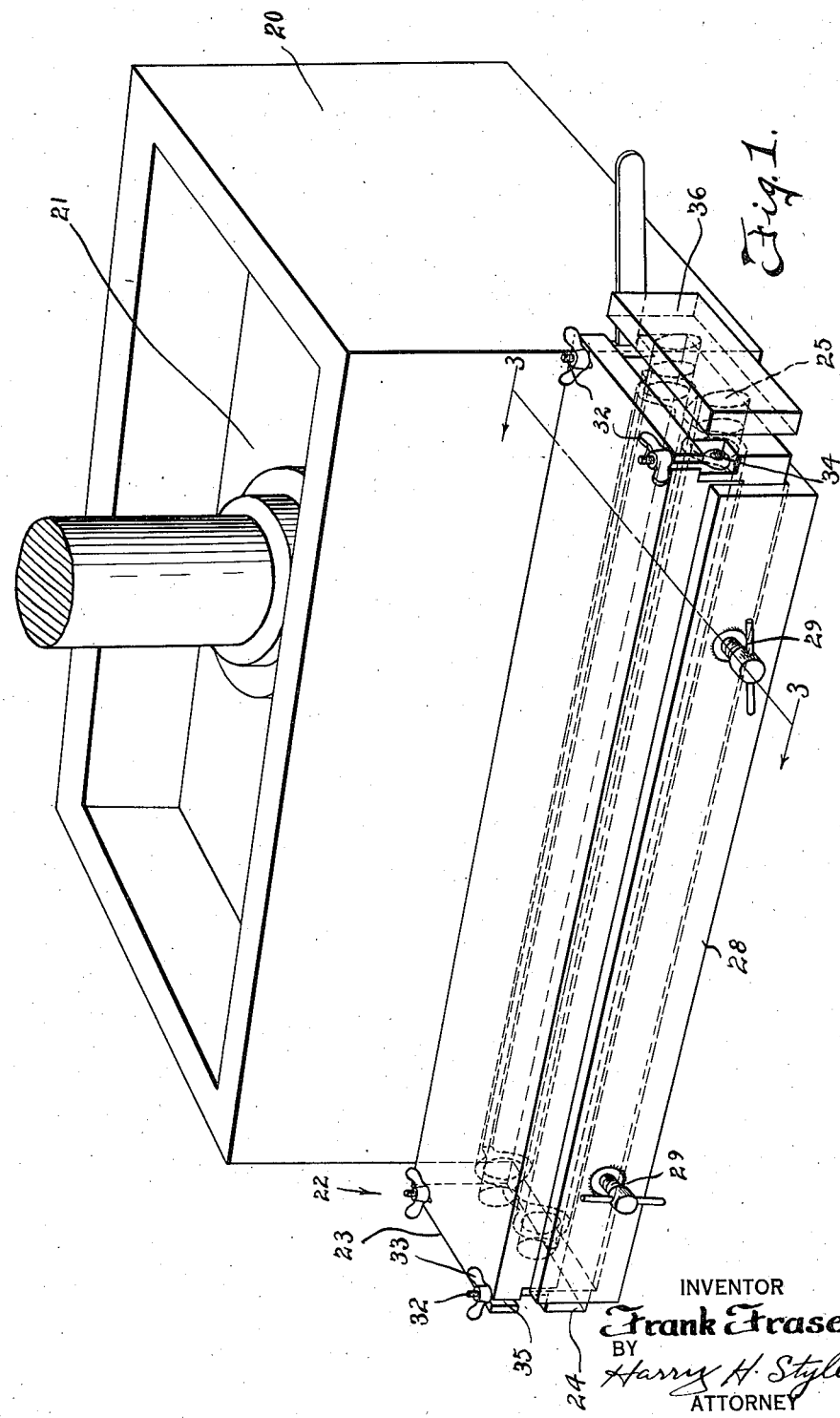
Figure 1 is a perspective view of one form of mold which may be used in accordance with my invention.

Heretofore spectacle and eyeglass frames, and the like, have been blanked out from seasoned cellulose composition material. Ordinarily the cellulose composition material was in sheet form, the sheets measuring about 21 by 50 inches, each sheet weighing approximately eight and one-half pounds, of which about two and one-half pounds were actually used in the construction of the frames, while the remaining six pounds were waste. The seasoned sheet stock as purchased costs approximately $1.20 per pound, while the waste material sells for an average of about ten cents a pound, and as about seventy-five per cent of the seasoned stock was waste, many thousands of dollars were lost annually with a resultant high cost of manufacture.

The scrap above referred to could not be re-worked, so as to produce first grade sheets for this work, and due to the fact that the re-working is an expensive proposition, it is hardly worth while to reclaim this waste material to form second grade stock. However, when the waste material is used in the production of second grade stock care must be exercised in keeping different types of the material separated, that is, keeping batches having different dyes or colors segregated, and when re-working, mixing this scrap material with new stock and working the same together; the resultant material is called stuffed stock, which is a poor grade or second grade material, and which cannot be used by the manufacturers of high class and high grade spectacle and eyeglass frames.

In addition to the expense of the sheet stock of cellulose composition material, due to the great amount of necessary waste when the blanks are cut out from sheet stock, it must be borne in mind that the dies, cutters, etc., employed in this form of manufacturing are exceptionally expensive, so that the actual cost of manufacturing ophthalmic spectacle and eyeglass mountings from sheet stock in this manner is very high.

With the present invention I provide means whereby the cellulose composition material can be, after it has been sufficiently mixed in the initial manufacture thereof, forced into suitable dies under pressure, which dies will cause the cellulose composition material to assume the shape of an ophthalmic blank, the said blank being in an elongated form or loop, what I call a master blank, from which numerous ophthalmic blanks can be cut, depending upon the length of the master blank. Obviously, in view of the fact that I form the composition material into the form of a master blank, I do away with the amount of wastage occasioned when blanks are stamped out from sheet stock.

It is to be understood that I do not wish to be limited by the structures shown in the accompanying drawings in view of the fact that my invention embodies the idea of forcing plastic cellulose material into a mold having the shape above set out under pressure, so that a master blank will be formed from which individual blanks can be cut, it being understood that the master blank is of the shape of the desired finished ophthalmic mounting in its initial form so that no scrap material is wasted.

Figure 3:
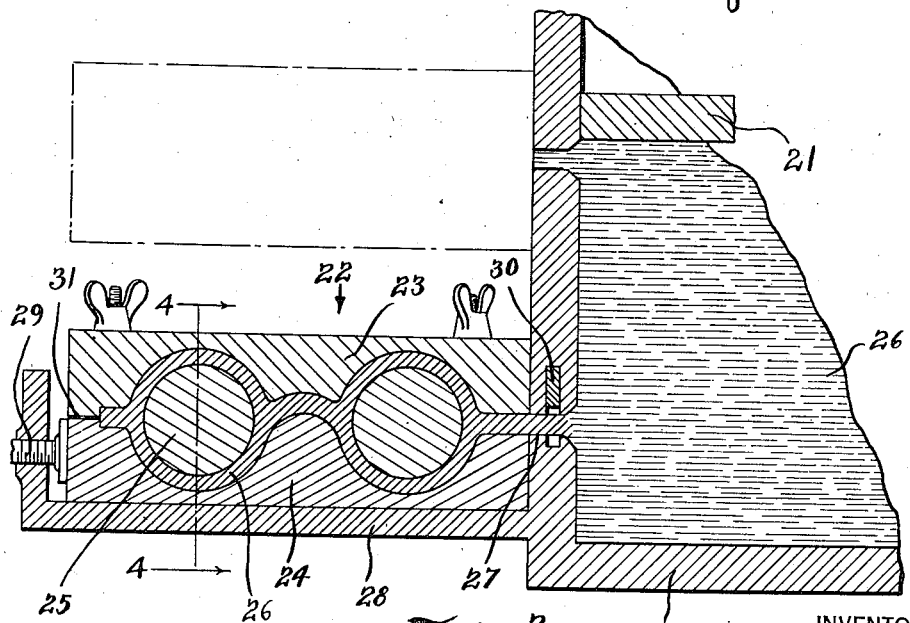
Figure 3 is a section on line 3—3 in Figure 1.
Figure 4:
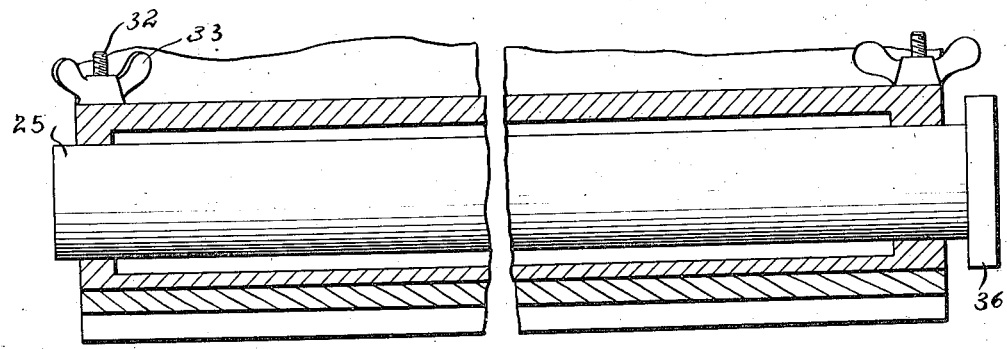
Figure 4 is a section taken on line 4—4 in Figure 3, looking in the direction of the arrows.

In Figure 1 of the drawings the numeral 20 designates generally the container in which the cellulose composition material is contained, while 21 designates a plunger with which pressure is applied to the composition material within the container or tank 20. A mold 22 is adapted to be associated with the container 20, and comprises the separable sections 23 and 24. The sections 23 and 24, as is shown in Figure 3, are shaped to assimilate the desired finished curvature of the blank. A pair of cores 25 are passed through the dies so that the cellulose composition material 26 can be forced through the opening in the wall 27 in the tank 20, into the dies or mold 22, as is clearly indicated in Figure 3. The die 22 is preferably supported on the platform or table 28, being firmly held in position by means of the clamp 29. A valve 30 is employed to cut off the flow of cellulose composition material after the necessary pressure has been applied upon the material within the mold. To allow for the escape of air from within the mold as the composition material is forced therein, small apertures 31 are provided. After the air has been exhausted from within the mold, I depend either upon the plugging up of the apertures by the cellulose composition material, or, if desired, small cups or valves can be employed to prevent oozing out of the material from within the mold. The sections of the mold 22 are securely clamped together by means of the pivoted screw threaded links 32 and thumb nuts 33, the said links 32 being pivoted on the pins 34 and adapted to be received through the slots 35 to permit of quick disassembling of the die sections when desired. The cores 25 are supported at one end by the plate 36 which is adapted to close the end of the die, while the opposite end extends through air tight openings formed in the ends of the mold. After the composition material has set up in the mold the cores may be removed and the die sections separated and the master blank removed from the said mold and either allowed to season or be separated into individual blanks immediately, allowing the individual blanks to season as desired.

Figure 2:
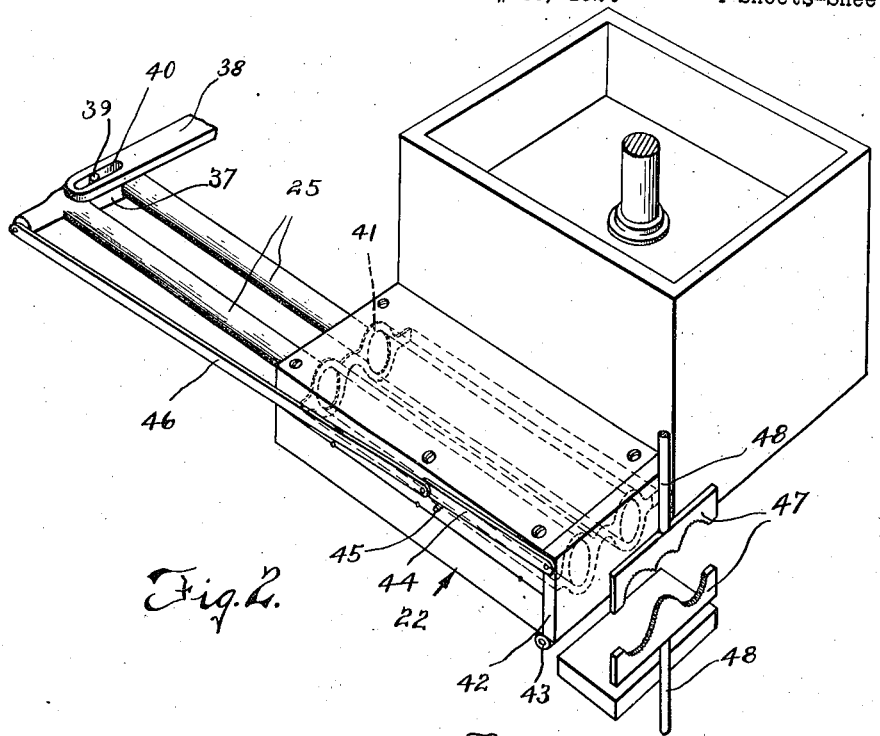
Figure 2 is a perspective view of a slightly modified form.

In Figure 2, I have shown means for removing the molded cellulose composition master blank from the mold without separating the mold sections 23 and 24, and to this end I extend the cores 25 beyond the end of the box and connect them as at 37 to each other so that they can be moved together. A lever 38 is connected to the portion 37 by means of the pin 39 riding in the slot 40. The lever 38 is adapted to be reciprocated or moved in such a manner as to reciprocate the cores 25 through the mold 22. A template 41 is carried by the cores 25 and is received within the mold 22 and is normally adapted to abut one end thereof to prevent the escape of the cellulose material as it is forced into the mold. The opposite end of the mold is closed by means of the hinged gate 42 which is hinged at 43 and has connection at one end with the link 44. The link 44 rocks about a pin 45 and is connected to the longer link 46, which is connected at the opposite end to the member 37. Upon reciprocation of the cores 25 the links 44 and 46 will cause the pivot door to be thrown open. The reciprocation of the cores will shove the template 41, which is keyed to the said cores against that end of the cellulose composition, thus forcing the cellulose composition and cores out of the mold. When the cores have been reciprocated as far as possible the jaws 47 carried by the plungers 48 are moved into engagement with the cellulose composition so as to firmly clamp the same and the cores are then reciprocated so as to withdraw them from within the master blank. At the same time that the cores are being drawn back into the mold, the door 42 will be closed and more cellulose composition will be forced onto the mold, and so on.

Figure 5:
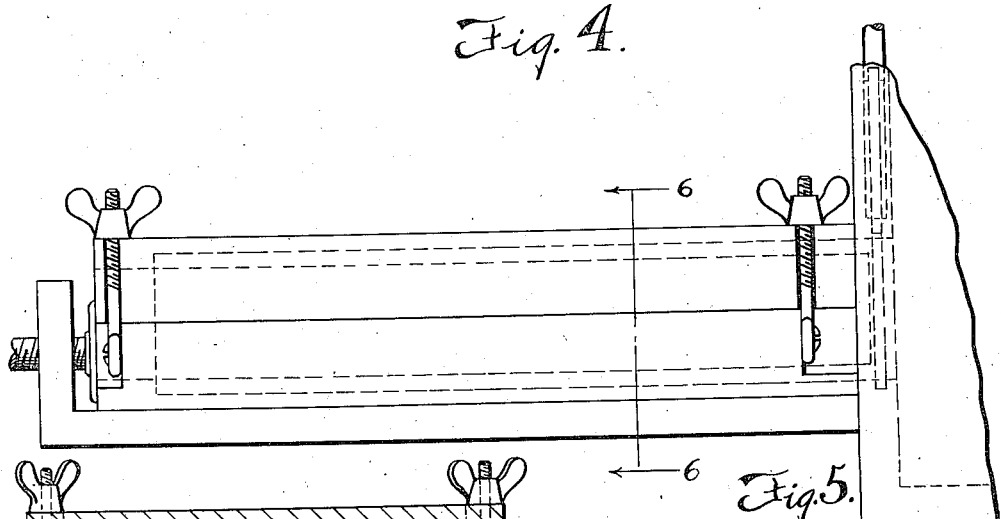
Figure 5 shows a slightly different use of the mold.
Figure 6:
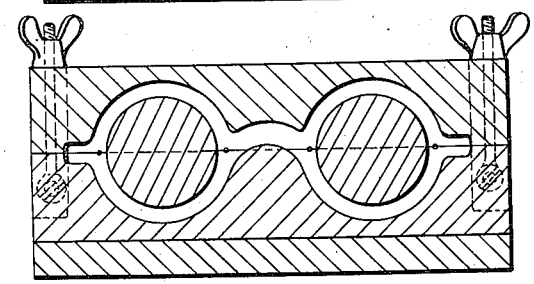
Figure 6 is a section taken on line 6—6 of Figure 5, looking in the direction of the arrow.

In Figures 5 and 6 the same type of mold is used, except that the cellulose composition is forced into the end of the mold instead of the side.

Figure 7:
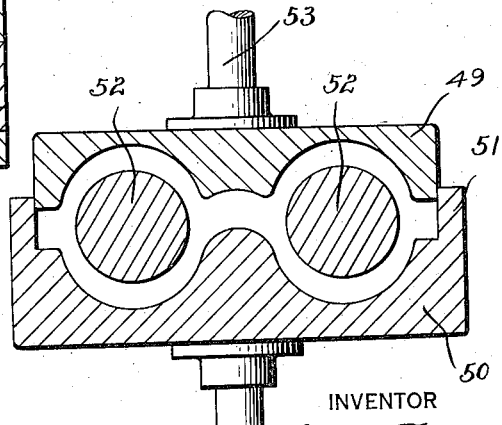
Figure 7 shows another form of mold.

In Figure 7 the die sections 49 and 50 are employed, the die section 50 having the upwardly extending lip 51 around its edges, and is adapted to receive the mold section 49. The cores 52 are rigidly supported and a slight excess of composition material is introduced within the mold, after which the section 49 is moved by means of the plunger 53 toward the stationary section 50 so as to thoroughly compress the cellulose material within the mold. Of course, the downward motion of the plunger 53 is restricted at that point where the desired shape of master blank has been formed.

In Figure 9 is shown the operation of separating the master blank 54 into the individual mounting blanks 55.

Figure 10 shows approximately the front view of the blank, while Figure 12 shows an end view of the blank as illustrated in Figures 10 and 11, which is similar to the blank that has heretofore been stamped out from sheet stock, but it will be noticed that none of the material heretofore wasted has been wasted in the present blank in view of the fact that the master blank 54 is formed in its shape in the initial molding of the composition material.

It is to be borne in mind that the cellulose composition material used is never in a solvent condition, so that it is impossible to pour it into molds to form individual mountings, such as for instance the pouring of molten metal. Furthermore, no one has ever before conceived of the idea of forcing the plastic composition material into a mold so as to produce a blank similar to my master blank from which the individual opthalmic mounting blanks can be cut.

In my co-pending application Serial Numeral 670,679, filed October 25, 1923, now Patent 1,607,522 dated Nov. 16, 1926, I disclosed the idea of forming such a master blank by extrusion.

The aim of the present invention is to provide means whereby the plastic material may be forced into a mold under pressure so that the consistency of the material will be constant throughout the entire blank.

If it is desired, after the individual blanks 55 have been cut out, they may be placed one at a time in a mold 56, which is so shaped that when pressure is applied it will cause the blank 55 to assume a shape similar to that shown in Figure 13. The mold 56 is adapted to round the edges of the blank to obviate the necessity of milling, and to also form the bridge 57. This molding operation can either take place while the blanks are still green, or, if it is desired, the blanks can be seasoned for a sufficient length of time and then molded.

In Figure 14 I show the blanks 55 as being dipped in a tank of suitable material 58 to give a luster or finish to the blanks to obviate the necessity of hand polishing. If the mold 56 does not sufficiently smooth the blanks they may be rattled or smoothed off as desired, after which they may be dipped in the solution 58 which will adhere to the blanks and give a suitable finish.

In addition to the foregoing it is to be understood that I may make provision to force the cellulose composition material into a suitable mold, after which it may be gradually removed from the mold and cut off into the individual length as it leaves the mold, and may then be dropped into the dies 56 and shaped and thus on until the blanks have been suitably seasoned and are ready for use as an opthalmic mounting.

On the other hand, the blanks 55 may be worked as the blanks have heretofore been done.

It will readily be apparent that the amount of cellulose material saved by forming the master blank 54 as I have above set out, will mount up so as to more than cover the expense of the dies and molds employed in my process. On the other hand it will not be necessary to go to the expense of making the templates, cutters, etc., heretofore used in stamping out such blanks from sheet stock.

It is to be understood that the form of the invention herewith shown and described is to be taken as the preferred embodiment of the same and that various changes in the size, shape and arrangement of parts may be resorted to without departing from the spirit of the invention or the scope of the subjoined claims.

Having thus described my invention, I claim:

1. The process of forming a master blank of the character described, consisting of forcing a plastic cellulose composition material into a mold, and then applying pressure to the mold to thoroughly compress the cellulose composition material.

2. The process of forming an ophthalmic blank consisting of forcing cellulose composition material into a mold having under pressure the general configuration of an ophthalmic mounting, applying pressure to the mold, and cutting the blank into desired thicknesses.

3. The process of forming an ophthalmic blank consisting of molding a master blank, cutting the master blank into blanks of the desired thicknesses, and then placing the individual blanks in a mold to shape the same.

4. The process of forming an ophthalmic blank consisting of molding a master blank, cutting the master blank into blanks of the desired thicknesses, placing the individual blanks in a mold to shape the same, and then dipping the shaped blanks into a finish producing solution.

5. The process of forming an ophthalmic blank consisting of molding a master blank, cutting the master blank into blanks of the desired thicknesses, placing the individual blanks in a mold to shape the same, and then subjecting the shaped blank to a polishing action.

6. The herein described process of manufacturing compressed spectacle frame blanks which comprises forming an article of plastic material with a cross sectional contour like that of a spectacle frame blank, then subjecting the said article to pressure while heated, then allowing it to cool, and then subdividing the article transversely thereof into a plurality of sections each of which constitutes a spectacle frame blank.

FRANK FRASER.